US008371978B2

(12) United States Patent
Nobata et al.

(10) Patent No.: US 8,371,978 B2
(45) Date of Patent: Feb. 12, 2013

(54) VEHICLE TRANSMISSION

(75) Inventors: Michio Nobata, Aichi-ken (JP); Toru Murayama, Nagoya (JP); Takehito Kato, Anjo (JP); Kazuhiro Chaen, Anjo (JP)

(73) Assignee: AISIN AW Co., Ltd., Aichi-ken (JP)

( * ) Notice: Subject to any disclaimer, the term of this patent is extended or adjusted under 35 U.S.C. 154(b) by 183 days.

(21) Appl. No.: 13/044,786

(22) Filed: Mar. 10, 2011

(65) Prior Publication Data
US 2011/0245010 A1 Oct. 6, 2011

(30) Foreign Application Priority Data

Mar. 31, 2010 (JP) .................................. 2010-083440
Dec. 14, 2010 (WO) .................. PCT/JP2010/072484

(51) Int. Cl.
*F16H 57/04* (2010.01)
(52) U.S. Cl. ...................................................... 475/160
(58) Field of Classification Search .................. 475/160; 184/6.12
See application file for complete search history.

(56) References Cited

U.S. PATENT DOCUMENTS

| 2,292,086 A * | 8/1942 | Pritchard ..................... 184/11.1 |
| 3,625,310 A * | 12/1971 | Herrick ........................ 184/6.12 |
| 4,414,861 A * | 11/1983 | Witt ............................. 74/606 A |
| 5,050,447 A * | 9/1991 | Hayakawa et al. ........ 74/606 R |
| 5,505,112 A * | 4/1996 | Gee ............................ 74/606 R |
| 5,718,651 A * | 2/1998 | Merkle et al. ................. 475/159 |
| 5,768,954 A * | 6/1998 | Grabherr et al. ............ 74/606 R |
| 6,189,412 B1* | 2/2001 | Tsubata et al. .............. 74/606 R |
| 6,616,432 B2 * | 9/2003 | Szczepanski et al. ........ 418/126 |
| 7,686,137 B2 * | 3/2010 | Tominaga et al. ............ 184/6.12 |
| 7,984,791 B2 * | 7/2011 | Taguchi et al. .............. 184/6.12 |
| 8,261,883 B2 * | 9/2012 | Ariga et al. .................. 184/13.1 |
| 2006/0048600 A1 | 3/2006 | Taguchi et al. |

FOREIGN PATENT DOCUMENTS

| JP | 2-62157 U | 5/1990 |
| JP | 11-108163 A | 4/1999 |
| JP | 2006-077894 A | 3/2006 |
| JP | 2006-275164 A | 10/2006 |
| JP | 2006-300094 A | 11/2006 |
| JP | 2008-019886 A | 1/2008 |

OTHER PUBLICATIONS

International Search Report (ISR) for corresponding International Patent Application No. PCT/JP2010/072484 mailed Mar. 8, 2011.

* cited by examiner

*Primary Examiner* — Dirk Wright
(74) *Attorney, Agent, or Firm* — Sughrue Mion, PLLC

(57) ABSTRACT

A vehicle transmission including a rotatable input shaft connected to a driving source; a countershaft parallel to the input shaft; a differential unit below the countershaft, to which rotation is input from the countershaft, and coupled to right and left wheels; a case member containing the input shaft, countershaft, and the differential unit; a differential chamber disposed in the case member, contains the differential unit, and is separated from an oil storage chamber; and a differential separation member separating the differential chamber from the storage chamber, and formed along the differential unit ring gear, which meshes with an output gear of the countershaft. The differential separation member has an opening so the output gear can mesh with the ring gear, a communication portion, formed in an upper part of the differential separation member, and located on an upstream side of the opening in a rotation direction of the ring gear during forward traveling, discharges oil from the differential chamber, and a wall member on a side of an output gear meshing portion and the ring gear with respect to the communication portion, and contacts the differential separation member outer surface.

6 Claims, 10 Drawing Sheets

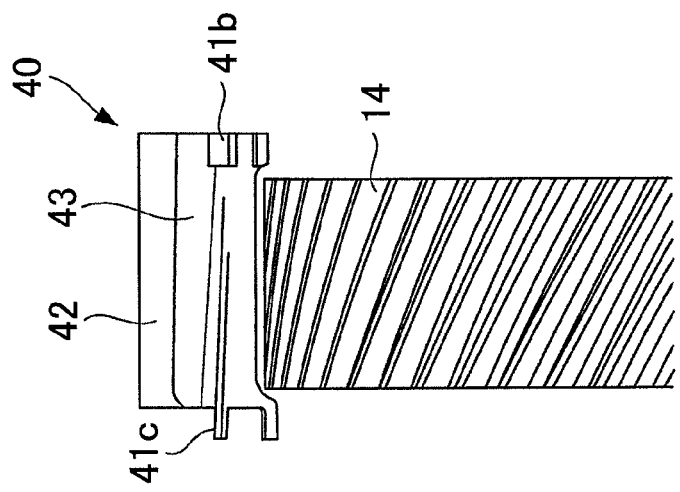
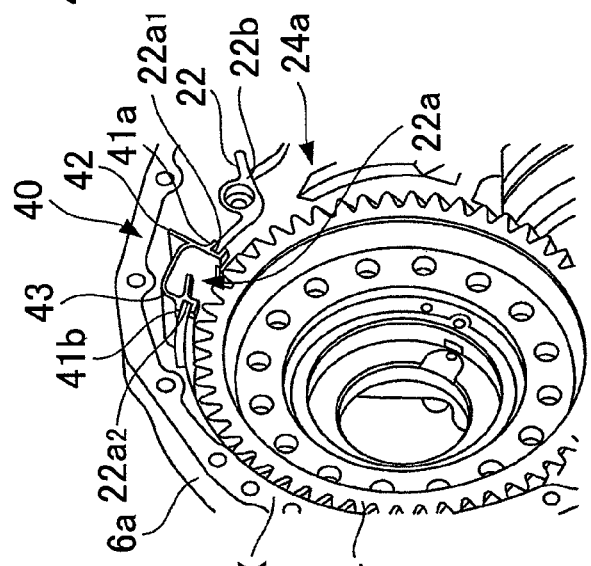
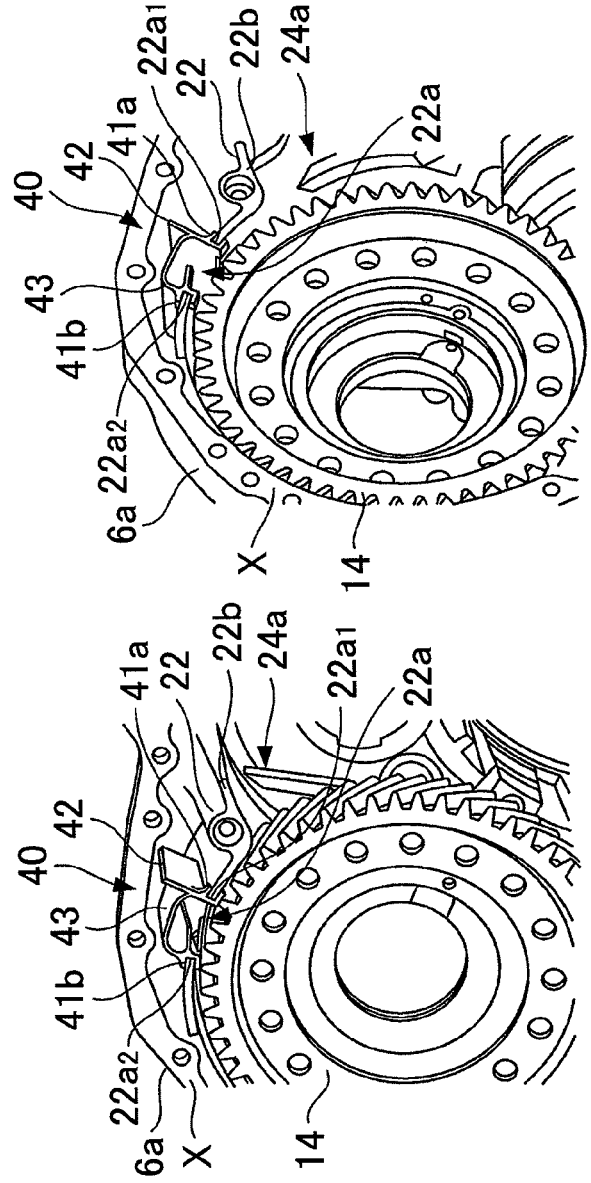

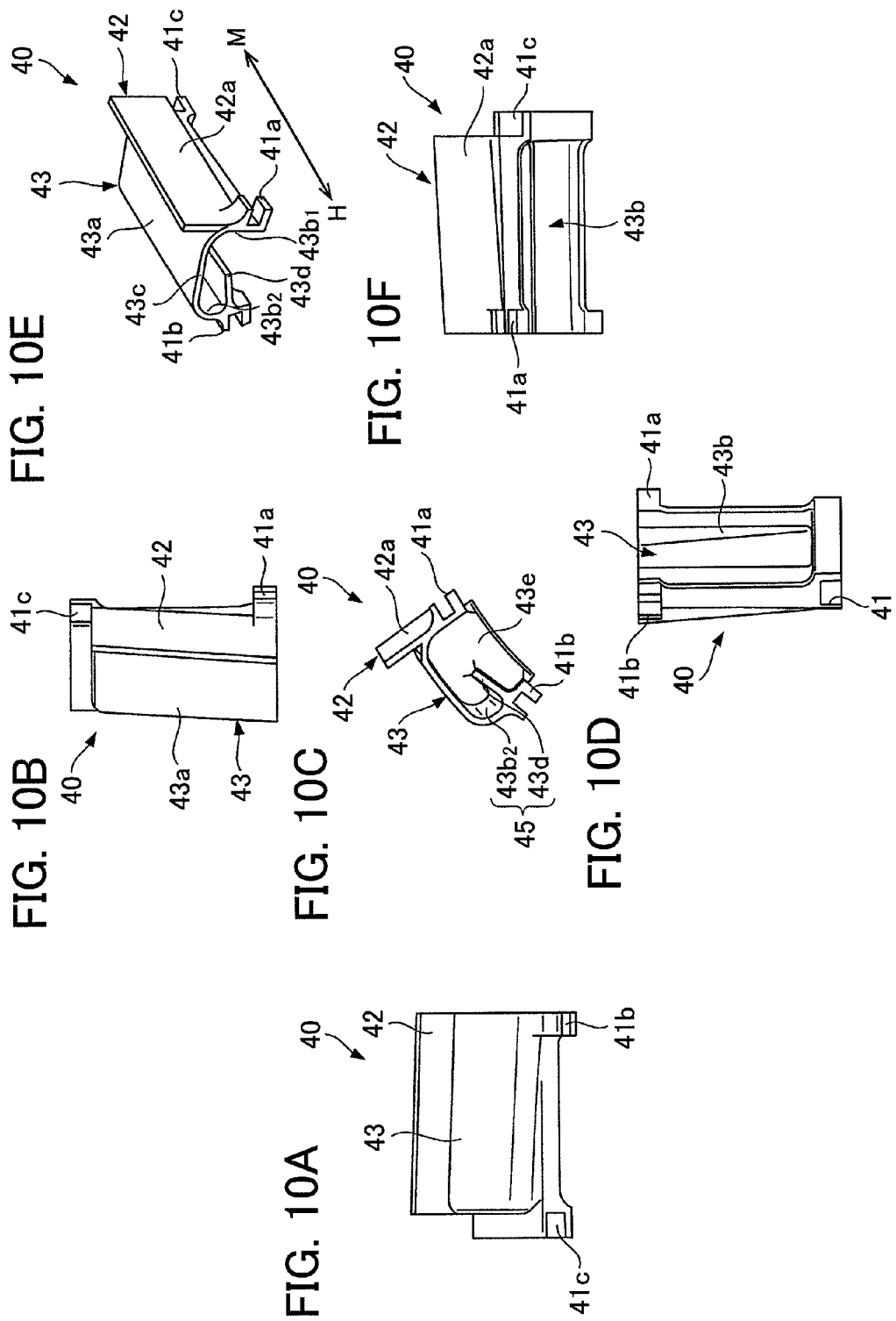

VEHICLE TRANSMISSION

INCORPORATION BY REFERENCE

The disclosures of Japanese Patent Application No. 2010-083440 filed on Mar. 31, 2010 and International Application No. WO2010JP072484 filed on Dec. 14, 2010 including the specification, drawings and abstract is incorporated herein by reference in its entirety.

BACKGROUND OF THE INVENTION

The present invention relates to vehicle transmissions that contain a differential unit in a case, and more particularly to case structures.

DESCRIPTION OF THE RELATED ART

In general, vehicle transmissions such as an automatic transmission and a hybrid drive device transmit power to wheels via a differential unit in order to allow a rotation difference between the left and right wheels. For example, conventionally known front engine front drive (FF) type transmissions, which are mounted in a transverse direction, integrally contain the differential unit in a case of the transmission.

In such vehicle transmissions containing the differential unit in the case, it has been proposed to provide a weir member 4 to separate a differential chamber 5 containing a differential mechanism (a differential unit) 10 from an oil pan chamber 3 storing hydraulic oil, so that the oil pan chamber 3 and the differential chamber 5 have different oil levels, and that the hydraulic oil in the differential chamber 5 is discharged into the oil pan chamber 3 by rotation of a ring gear 14 of the differential mechanism 10 (see Japanese Patent Application Publication No. JP-A-2008-19886). In this manner, the transmission 1 described in Japanese Patent Application Publication No. JP-A-2008-19886 reduces the amount of hydraulic oil in the differential chamber as much as possible to reduce the resistance when stirring the hydraulic oil during rotation of the ring gear 14.

SUMMARY OF THE INVENTION

However, in the transmission described in Japanese Patent Application Publication No. JP-A-2008-19886, a secondary shaft 8 is provided on the upper side of the ring gear 14, and the ring gear 14 meshes with a final gear 9 of the secondary shaft 8 before the hydraulic oil caught by the ring gear 14 is discharged into the oil pan chamber 3. Thus, the hydraulic oil caught by the ring gear 14 may be caused to stay in the grooves of the teeth of the ring gear 14 in the meshing portion where the ring gear 14 meshes with the final gear 9, and may flow back to the differential chamber 5 as it is. Moreover, the hydraulic oil scattered from a counter driven gear 13 of the secondary shaft 8 may flow into the differential chamber 5 from above.

It is an object of the present invention to provide a vehicle transmission that is capable of efficiently discharging, into a storage chamber, oil in a differential chamber that contains a differential unit, and is structured so that the oil is less likely to flow into the differential chamber.

A vehicle transmission according to the present invention (see, e.g., FIGS. 5 to 9C) includes: an input shaft that is connected to a driving source and rotates; a countershaft provided parallel to the input shaft; a differential unit, which is positioned below the countershaft, to which rotation is input from the countershaft, and which is coupled to right and left wheels; a case member that contains the input shaft, the countershaft, and the differential unit; a differential chamber that is located in the case member, contains the differential unit, and is separated from a storage chamber that stores oil; and a differential separation member that separates the differential chamber from the storage chamber, and is formed along a ring gear of the differential unit, which meshes with an output gear of the countershaft. In the vehicle transmission, the differential separation member has an opening that opens so that the output gear can mesh with the ring gear, a communication portion, which is formed in an upper part of the differential separation member, and is located on an upstream side of the opening in a rotation direction of the ring gear during forward traveling, and which discharges the oil from the differential chamber, and a wall member that is provided on a side of a meshing portion of the output gear and the ring gear with respect to the communication portion, and stands so as to contact an outer surface of the differential separation member.

Thus, the communication portion for discharging the oil contained in the differential chamber is provided on the upstream side of the meshing portion of the ring gear of the differential unit and the output gear of the countershaft in the rotation direction of the ring gear during forward traveling. Accordingly, the oil caught by the ring gear can be efficiently discharged out of the differential chamber via the communication portion. Moreover, since the wall member is provided above the communication portion, the oil scattered from above the communication portion can be prevented from flowing into the differential chamber through the communication portion. Thus, since the oil contained in the differential chamber can be efficiently discharged through the communication portion, and the wall member can prevent the oil from flowing into the differential chamber through the communication portion, the oil level in the differential chamber can be maintained at a low level, and the stirring resistance of the ring gear can be reduced.

The present invention (see, e.g., FIGS. 5-9C) is characterized in that the wall member has a main body portion that stands upward with a lower side of the wall member being in contact with the outer surface of the differential separation member, and a guide portion that guides the oil, which flows from above the communication portion along the outer surface of the differential separation member, to a side below the communication portion.

Thus, by using the guide portion, the oil scattered from above the differential chamber can be guided to the side below the communication portion after flowing onto the outer surface of the main body portion. This can reduce the amount of oil that flows into the differential chamber.

Moreover, specifically (see, e.g., FIGS. 4A-4D), it is preferable that the guide portion be formed by bending the main body portion, and be formed so that a width of the guide portion decreases from the main body portion toward a tip end.

That is, since the guide portion is formed by bending the main body portion of the wall member, and is formed so that the width of the guide portion decreases from the main body portion toward the tip end, the oil discharged from the communication portion can be efficiently discharged. This can prevent the oil discharged from the communication portion from flowing back into the differential chamber.

It is preferable that the differential separation member (see, e.g., FIGS. 4A-4D, 6, and 7) have the case member, a rib member that extends from the case member along an outer peripheral surface of the ring gear, and a semispherical reservoir plate that covers the differential unit from a side opposite to an inner surface of the case member with the ring gear interposed therebetween, and that the communication portion be formed in the rib member.

Thus, the oil can be efficiently discharged from the communication portion formed in the rib member.

It is also preferable that the wall member (see, e.g., FIGS. 4A-4D) be formed integrally with the reservoir plate.

That is, since the wall member is formed integrally with the reservoir plate, the wall member can be provided without processing the case member. This facilitates processing, and can also contribute to reduction in cost.

It is also preferable that the wall member (see FIGS. 8 and 9A-9C) be formed separately from the reservoir plate, and that the wall member be attached to the rib member so as not to protrude beyond a mating end face of the rib member with the reservoir plate.

That is, since the wall member is formed separately from the reservoir plate, and the wall member is attached to the rib member so as not to protrude beyond the mating end face of the rib member with the reservoir plate, assembly capability is increased, and the wall member can be prevented from being damaged by contact with other members during assembly.

BRIEF DESCRIPTION OF THE DRAWINGS

FIG. 4A is a plan view when an opening is viewed from above, FIG. 4B is a front view, FIG. 4C is a plan view when a wall member is viewed from above, and FIG. 4D is a back view;

FIGS. 9A to 9C are schematic diagrams showing an attached state of a wall member according to a second embodiment of the present invention, where FIG. 9A is a perspective view from the front side, FIG. 9B is a perspective view from the back side, and FIG. 9C is a back view; and FIGS. 10A to 10F are schematic diagrams of the wall member according to the second embodiment of the present invention, where FIG. 10A is a back view, FIG. 10B is a plan view, FIG. 10C is a side view, FIG. 10D is a bottom view, FIG. 10E is a perspective view, and FIG. 10F is a front view.

DETAILED DESCRIPTION OF THE EMBODIMENTS

Embodiments of the present invention will be described below with reference to the accompanying drawings. The automatic transmissions of the present embodiments are six-forward speed automatic transmissions that are preferably mounted on a front engine front drive (FF) vehicle, and the "lateral direction" as used herein corresponds to the lateral direction in the state in which the automatic transmission is actually mounted on a vehicle. Note that the "vertical direction" as used herein is defined based on the state in which the automatic transmission is mounted on the vehicle. In the state in which the automatic transmission is mounted on the vehicle, the right side in FIG. 2 corresponds to the front side of the vehicle, and the left side in FIG. 2 corresponds to the rear side of the vehicle.

First Embodiment

[General Structure of Automatic Transmission]

Figure 1:
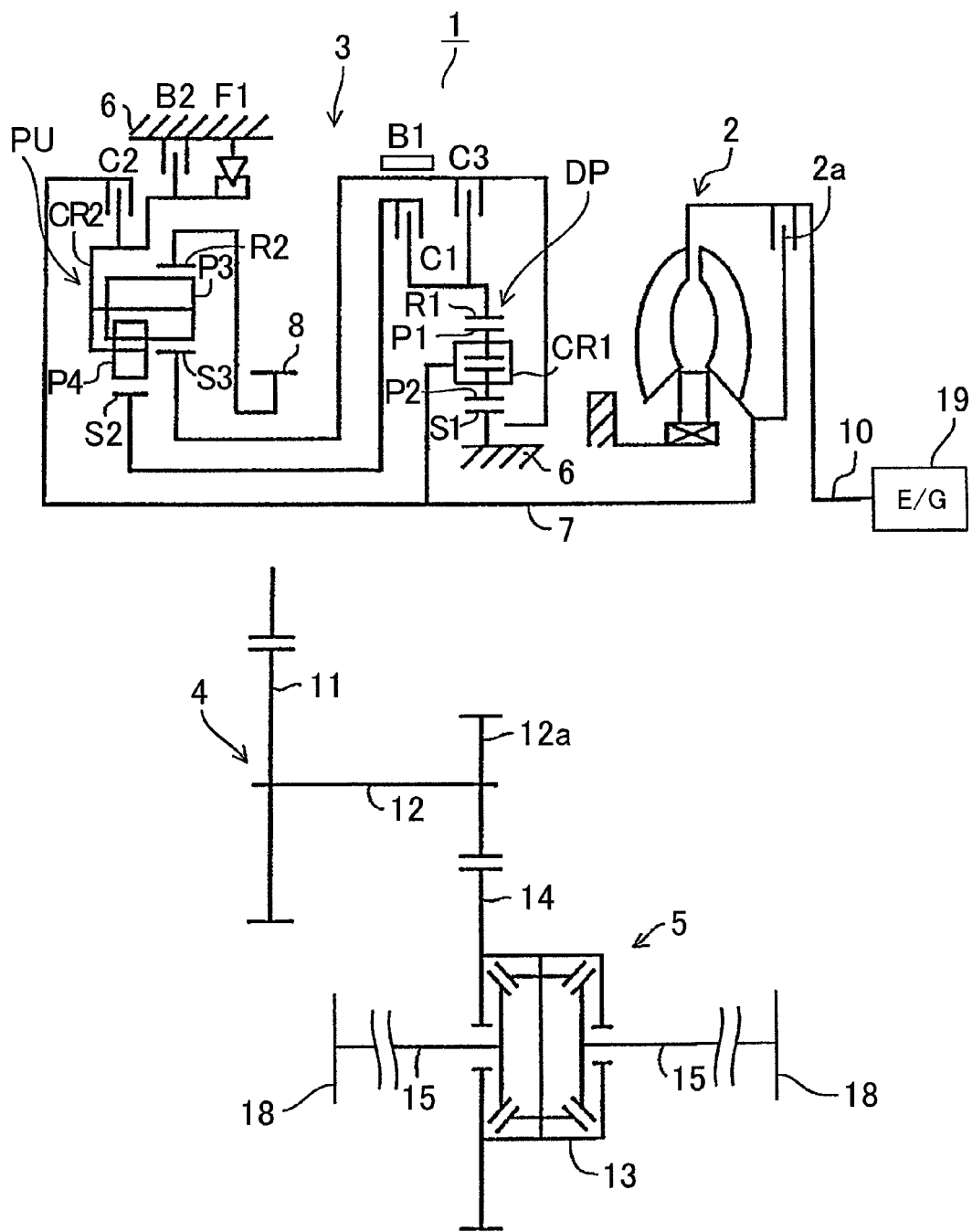
FIG. 1 is a skeleton diagram of an automatic transmission according to a first embodiment of the present invention.

First, the general structure of an automatic transmission 1 to which the present invention can be applied will be described below. As shown in FIG. 1, the FF type automatic transmission 1 includes a case member 6 that contains a speed change mechanism 3, a countershaft portion 4, and a differential unit 5. An input member (a front cover and a center piece) 10 as the automatic transmission 1 which can be connected to an engine (a driving source) 19, and a torque converter 2 having a lockup STOP clutch 2a are disposed forward of the case member 6.

The torque converter 2 is positioned on an axis centered on an input shaft 7 of the speed change mechanism 3, which is located coaxially with an output shaft of the engine 19, so that a driving force from the engine 19 is output to the input shaft 7 while allowing a rotational speed difference from the engine 19, or is directly output to the input shaft 7 by engaging the lockup clutch 2a. In other words, the input shaft 7 is structured to rotate by connecting to the engine 19 via the torque converter 2.

The countershaft portion 4 is positioned on a countershaft 12 located on an axis that is parallel to the input shaft 7. The differential unit 5 is positioned so as to have differential shafts 15, 15 connected to right and left wheels 18, 18, on an axis parallel to the countershaft 12.

The speed change mechanism 3 is provided with a planetary gear (a speed reduction planetary gear) DP on the input shaft 7, and is also provided with a planetary gear unit (a planetary gear set) PU rearward of the planetary gear DP. The planetary gear DP is a so-called double pinion planetary gear including a first sun gear S1, a first carrier CR1, and a first ring gear R1, and having, on the first carrier CR1, a pinion P2 meshing with the first sun gear S1, and a pinion P1 meshing with the first ring gear R1 so that the pinions P2, P1 mesh with each other.

The planetary gear unit PU is a so-called Ravigneaux type planetary gear including, as four rotating elements, a second sun gear S2, a third sun gear S3, a second carrier CR2, and a second ring gear R2, and having, on the second carrier CR2, a long pinion P3 meshing with the third sun gear S3 and the second ring gear R2, and a short pinion P4 meshing with the second sun gear S2 so that the long and short pinions P3, P4 mesh with each other.

The first sun gear S1 of the planetary gear DP is held stationary with respect to the case member 6. The first carrier CR1 is connected to the input shaft 7 to rotate in the same manner as that of the input shaft 7 (hereinafter referred to as the "input rotation"). Moreover, the first ring gear R1 rotates at a speed reduced from that of the input rotation, namely rotates as "reduced rotation," by the first sun gear S1 that is held stationary, and the first carrier CR1 that rotates as the input rotation. The first ring gear R1 is connected to a first clutch C1 and a third clutch C3.

The third sun gear S3 of the planetary gear unit PU is connected to a first brake B1 so as to be capable of being held stationary with respect to the case member 6, and is connected to the third clutch C3 so that the reduced rotation of the first ring gear R1 can be input to the third sun gear S3. The second sun gear S2 is connected to the first clutch C1 so that the reduced rotation of the first ring gear R1 can be input to the second sun gear S2.

Moreover, the second carrier CR2 is connected to a second clutch C2 to which the rotation of the input shaft 7 is input, so that the input rotation can be input to the second carrier CR2 via the second clutch C2. The second carrier CR2 is also connected to a one-way clutch F1 and a second brake B2, so that rotation of the second carrier CR2 in one direction with respect to the case member 6 is restricted via the one-way clutch F1, and so that the second carrier CR2 can be held stationary via the second brake B2. The second ring gear R2 is connected to a counter gear 8 that is supported so as to be rotatable relative to a center support member fixed to the case member 6.

A large-diameter input gear (a counter driven gear) 11, which is fixed to the countershaft 12 of the countershaft portion 4, meshes with the counter gear 8, and a differential ring gear (a ring gear) 14 of the differential unit 5 meshes with the countershaft 12 via a small-diameter output gear 12a that is formed on the outer peripheral surface of the countershaft 12. The differential ring gear 14 is fixed to a differential gear 13, and is connected to the right and left differential shafts 15, 15 via the differential gear 13.

[Case Structure]

Figure 2:
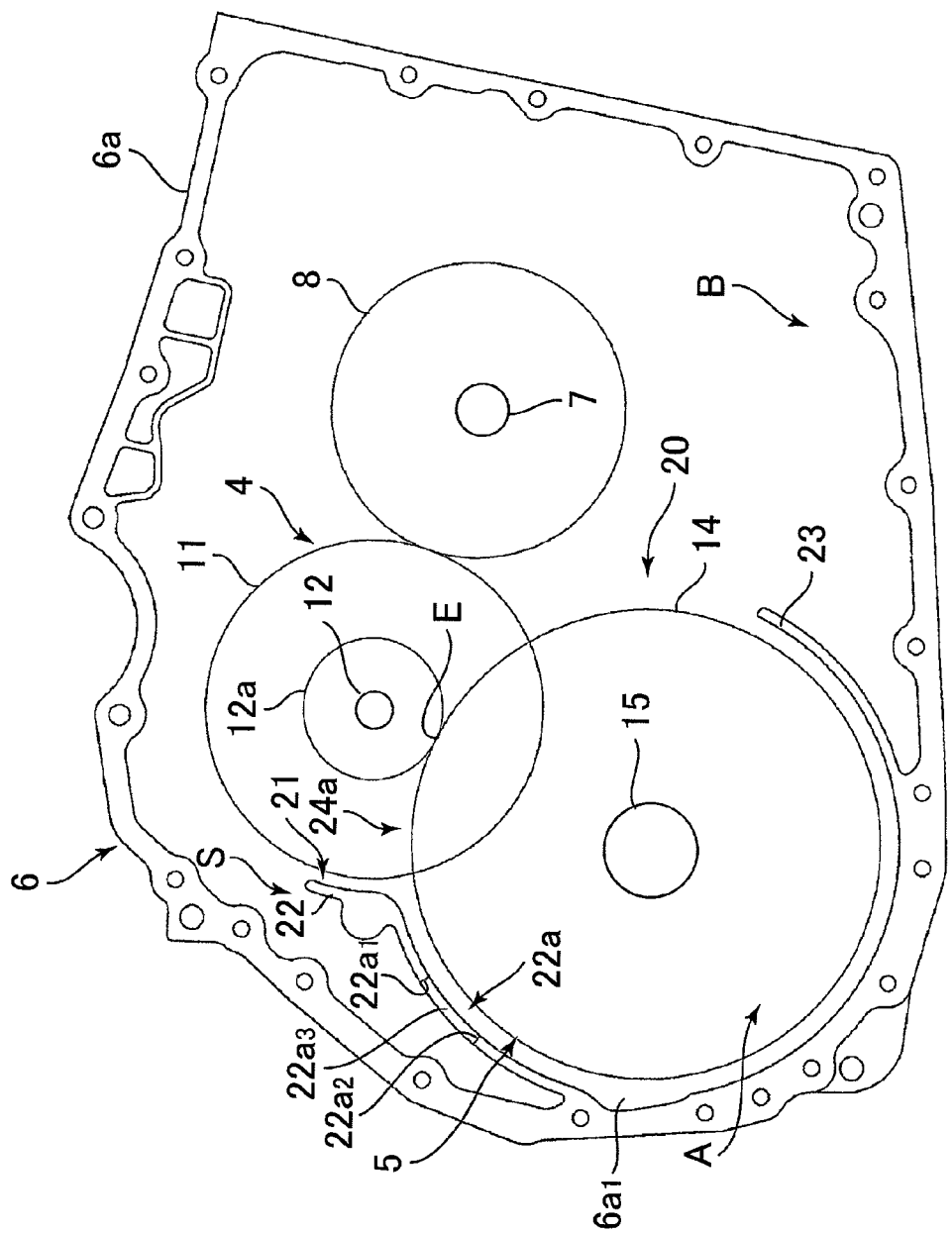
FIG. 2 is a front view of a transmission case of the automatic transmission according to the first embodiment of the present invention.
Figure 3:
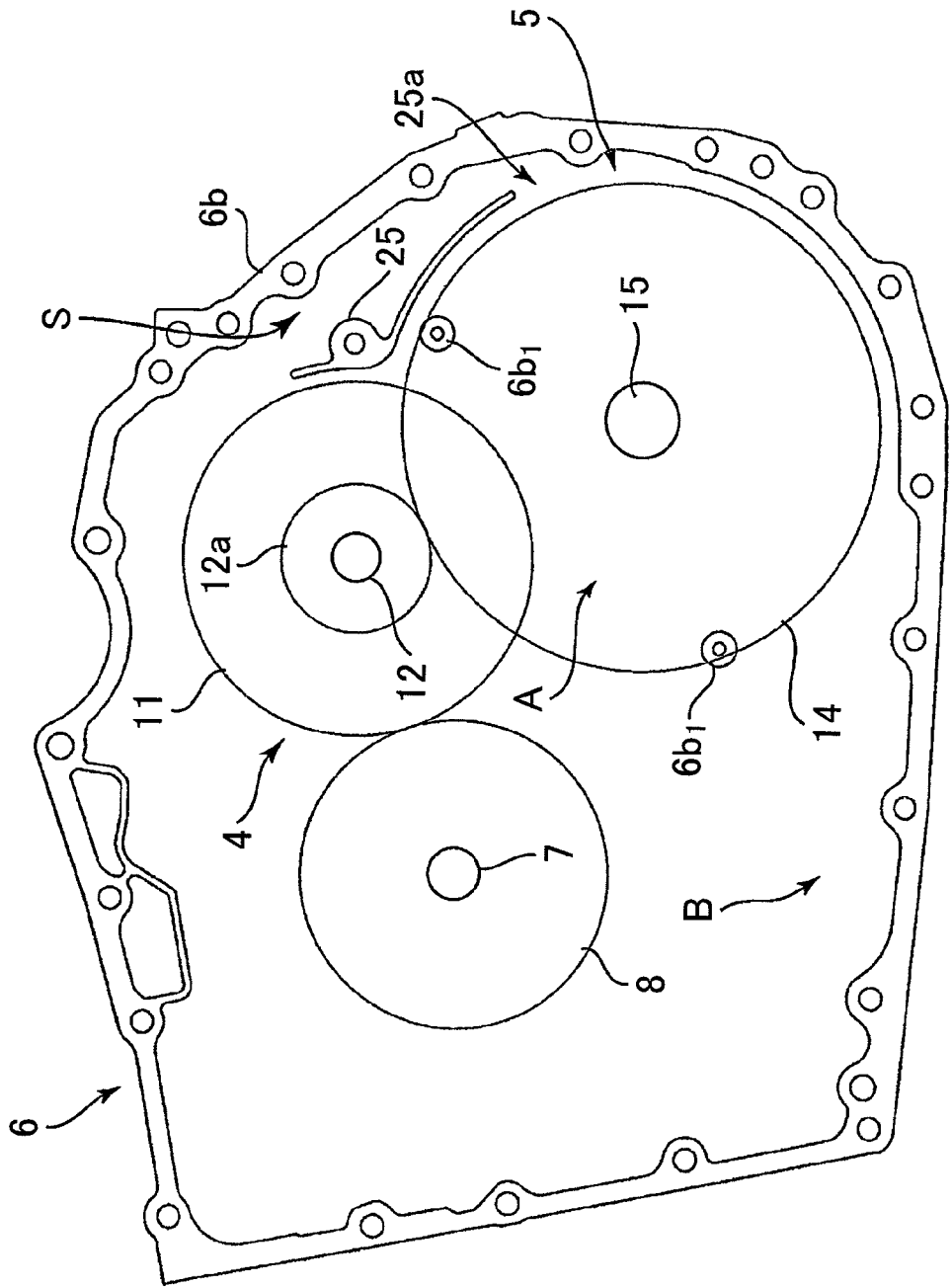
FIG. 3 is a front view of a housing case of the automatic transmission according to the first embodiment of the present invention.

The case member 6 will be described below. As shown in FIGS. 2-3, the case member 6 has a transmission case 6 (see FIG. 2) that contains the input shaft 7, the countershaft 12, and the differential unit 5, and a housing case 6b (see FIG. 3) that is attached to the transmission case 6a from the engine side. The case member 6 is integrally formed by attaching the housing case 6b to the transmission case 6a by a plurality of bolts.

The case member 6 contains, in a lower front part of the automatic transmission 1 (that is, on the driving source side (the right side) in the state in which the automatic transmission 1 is mounted on the vehicle), the differential unit 5 that is formed by the differential ring gear 14, the differential gear 13, and the differential shafts 15. The countershaft 12 is provided above the differential unit 5. The countershaft 12 is provided at a horizontal position different from that of the differential shafts 15, and the countershaft 12, the differential shafts 15, and the input shaft 7 are arranged in a triangular pattern in the case member 6.

A storage chamber B for storing oil that is sucked by a strainer, not shown, is formed in the lower side of the case member 6. The differential unit 5 is contained in a differential chamber A, which is located in the case member and is separated from the storage chamber B by a differential separation member 20. The differential separation member 20 is formed along the differential ring gear 14, and includes the transmission case 6a, a rib member 21 that extends from the transmission case 6a along the outer peripheral surface of the differential ring gear 14, and a reservoir plate 30 (see FIGS. 4A-4D) that will be described in detail later.

As shown in FIG. 2, the rib member (hereinafter referred to as the "transmission rib") 21 of the transmission case 6a is formed by an upper rib 22 that extends from the transmission case 6a on the upper side of the differential chamber A, and a lower rib 23 that extends upward from the bottom of the transmission case 6a along the outer peripheral surface of the differential ring gear 14. Between the upper rib 22 and the lower rib 23 is an opening 24a that opens so that the differential ring gear 14 can mesh with the output gear 12a of the countershaft 12.

The upper rib 22 extends from the transmission case 6a toward a meshing portion E where the differential gear 14 meshes with the output gear 12a, and to the outer diameter side of the input gear 11 of the countershaft 12, and the tip end of the upper rib 22 is bent upward along the outer peripheral surface of the input gear 11. This reduces the possibility that oil scattered from the countershaft 12, the input gear 11, and the output gear 12a onto an upper part of the inner surface of the transmission case 6a may enter the differential chamber A. That is, the oil scattered from the countershaft 12, the input gear 11, and the output gear 12a is actively introduced into a space portion S between the transmission case 6a and the outer surface of the upper rib 22, and is guided and discharged to the housing case side, whereby the amount of oil that flows into the differential chamber A is reduced.

A cutout 22a having a constant width is provided in an intermediate portion of the upper rib 22 so as to extend toward an inner surface $6a_1$ of the transmission case 6a (in the axial direction of the differential shafts 15). The cutout 22a is formed on the upstream side of the opening 24a in a rotation direction (a rotation direction $R_2$ in FIG. 5) of the differential ring gear 14 during forward traveling, so that oil caught by the differential ring gear 14 can be discharged from the differential chamber A to the storage chamber B before the oil reaches the meshing portion E.

As shown in FIG. 3, a housing rib 25 having substantially the same shape as that of the upper rib 22 of the transmission case 6a is formed in the housing case 6b. The upper rib 22 and the housing rib 25 are structured so that when the housing case 6b is attached to the transmission case 6a, the outer peripheral surface of the upper rib 22 is substantially flush with the outer peripheral surface of the housing rib 25, and the oil entering the space portion S can be guided to the housing case side.

Unlike the upper rib 22, the housing rib 25 protrudes like eaves on the outer diameter side of the reservoir plate 30, and does not directly form the outer wall of the differential chamber A. Thus, no cutout 22a for discharging the oil from the differential chamber A is provided in an intermediate portion of the housing rib 25. However, the base end of the housing rib 25, which is located on the side opposite to the tip end thereof that is bent upward along the outer peripheral surface of the input gear 11, opens without connecting to the housing case 6b. This opening of the housing rib 25 serves as a discharge port 25a for discharging the oil, which flows into the space portion S between the case member 6 and the rib members 21, 25 formed by the transmission rib 21 and the housing rib 25, toward the storage chamber B.

As shown in FIGS. 4A-4D, the reservoir plate 30 is a substantially semispherical (bowl-shaped) case member that protrudes in a central portion 34 thereof. On the outer peripheral edge of the reservoir plate 30 are formed wide, fin-like flange portions 31a, 31b located on the upper and lower sides of the reservoir plate 30.

The outer peripheral edge of the reservoir plate 30 is formed so as to open partially, and this opening 34b communicates with an insertion hole 34a, which is formed in the middle of the reservoir plate 30 to insert the differential shafts 15 therethrough. A wall member 33 that stands upward is formed integrally with the reservoir plate 30, between the opening 34b and the upper flange 31b.

Figure 4:
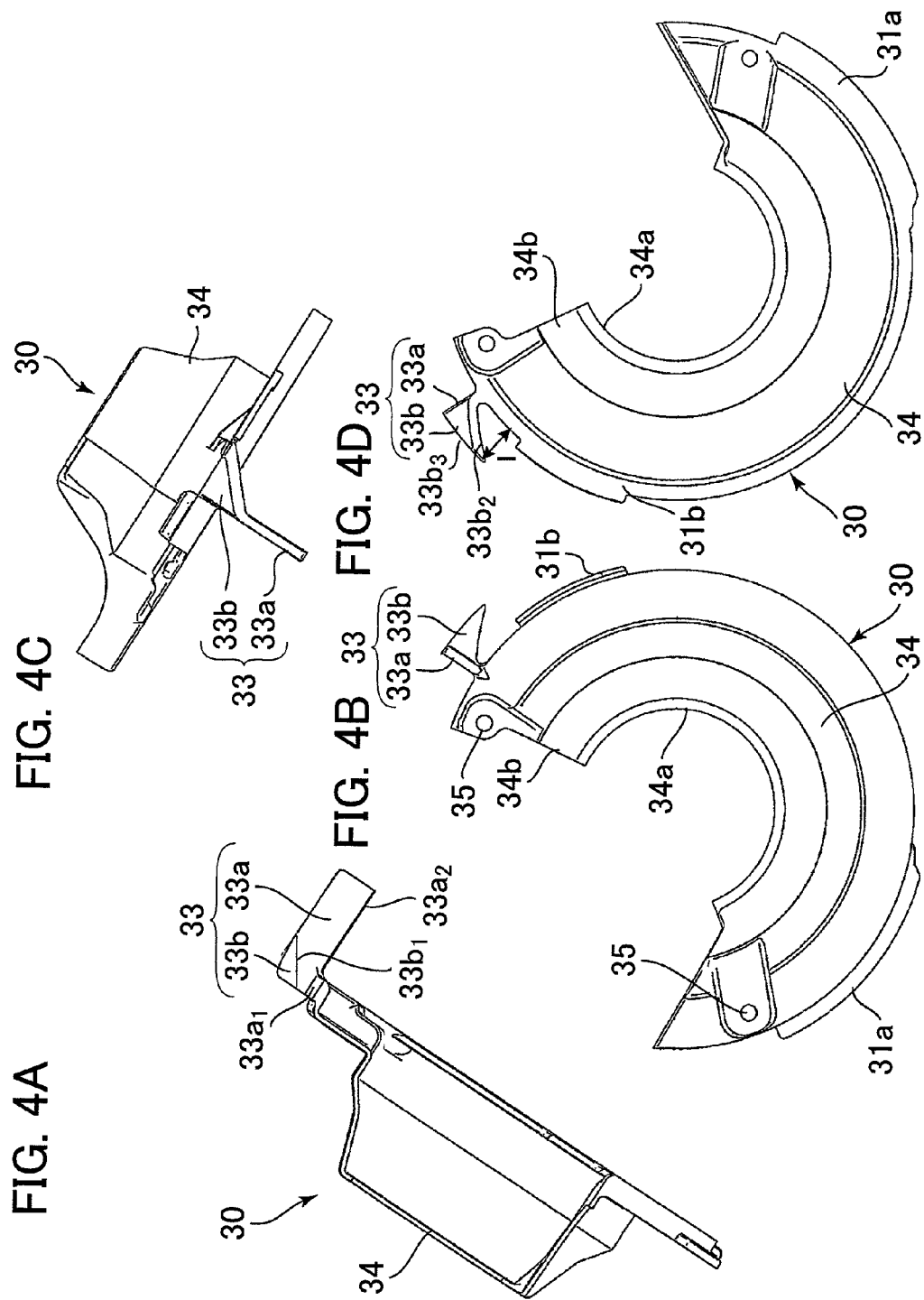
FIGS. 4A to 4D are diagrams of a reservoir plate of the automatic transmission according to the first embodiment of the present invention, where

The wall member 33 is formed by a main body portion 33a that extends to the side opposite to the central portion 34 that protrudes toward the housing case in the axial direction of the differential shafts 15, and a guide portion 33b that is formed by bending the end of the main body portion 33a located on the housing case side, at an obtuse angle toward the flange portion 31b. The guide portion 33b has a triangular shape so that the width of the guide portion 33b decreases from the main body portion 33a toward the tip end of the guide portion 33b, and the tip end of the guide portion 33b extends to the flange portion 31b. More specifically, as shown in FIG. 4A, the main body portion 33a has a rectangular shape as viewed from the front, and the guide portion 33b is formed by bending a corner of the main body portion 33a located on the upper side in the reservoir plate 30. The guide portion 33b is structured so that a base end $33b_1$ does not start at the same position as that of base ends $33a_1$, $33a_2$ of the main body portion 33a.

That is, the main body portion 33a is structured to necessarily stand perpendicularly at the attachment portion $33a_1$ to the reservoir plate 30, and the lower edge $33a_2$ that contacts the upper rib 22. The guide portion 33b is formed by bending the main body portion 33a in an intermediate part of the standing of the base ends $33a_1$, $33a_2$ of the main body portion 33a.

Especially as shown in FIG. 4D, the guide portion 33b has a triangular shape as its upper edge $33b_3$ is always located at the same height as the main body portion 33a, and its lower edge $33b_2$ is tilted upward, so that the distance 1 between the guide portion 33b and the reservoir plate 30 increases toward the tip end of the guide portion 33b.

Figure 5:
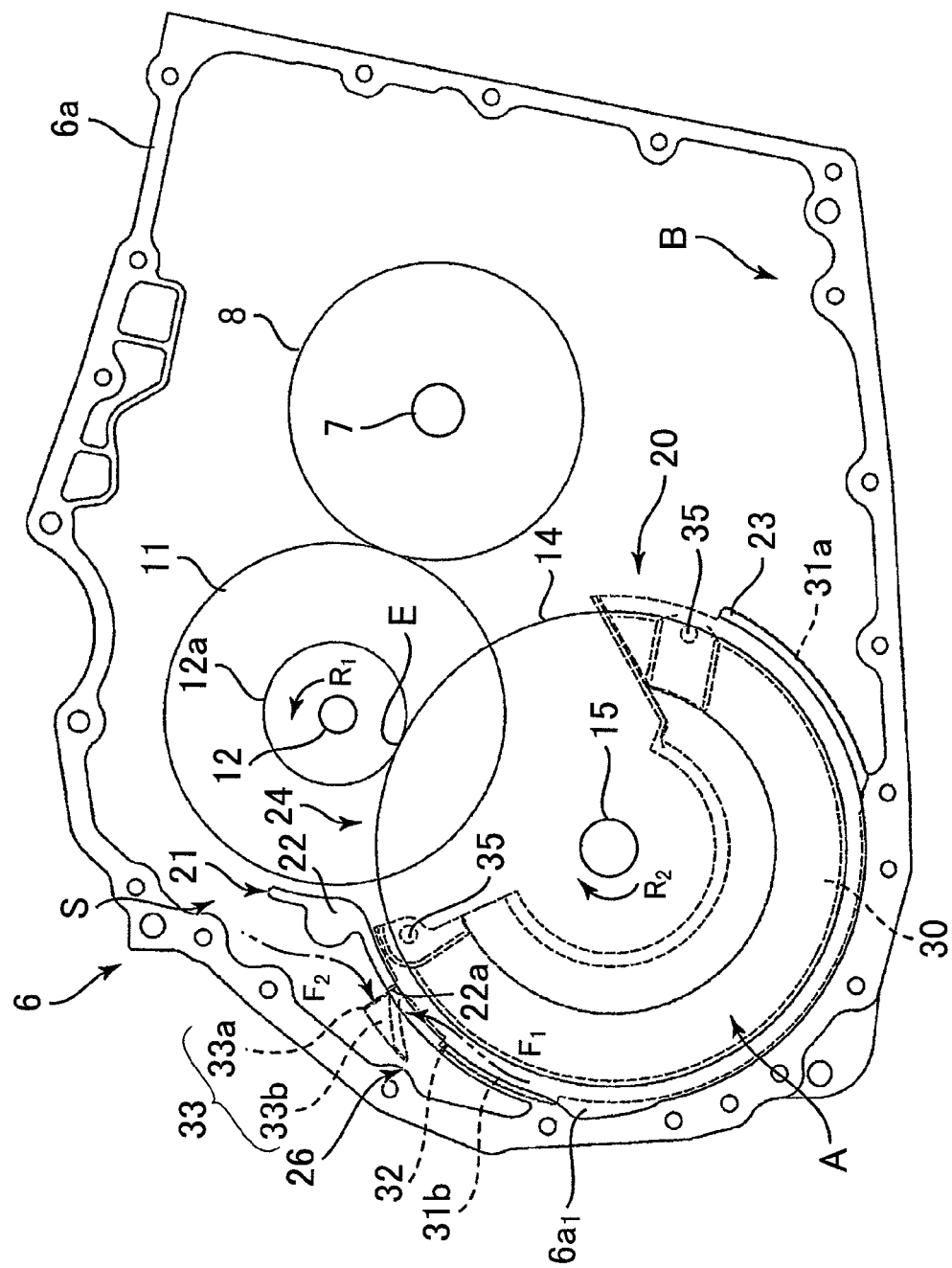
FIG. 5 is a front view showing the state in which the reservoir plate is attached in FIG. 2.
Figure 6:
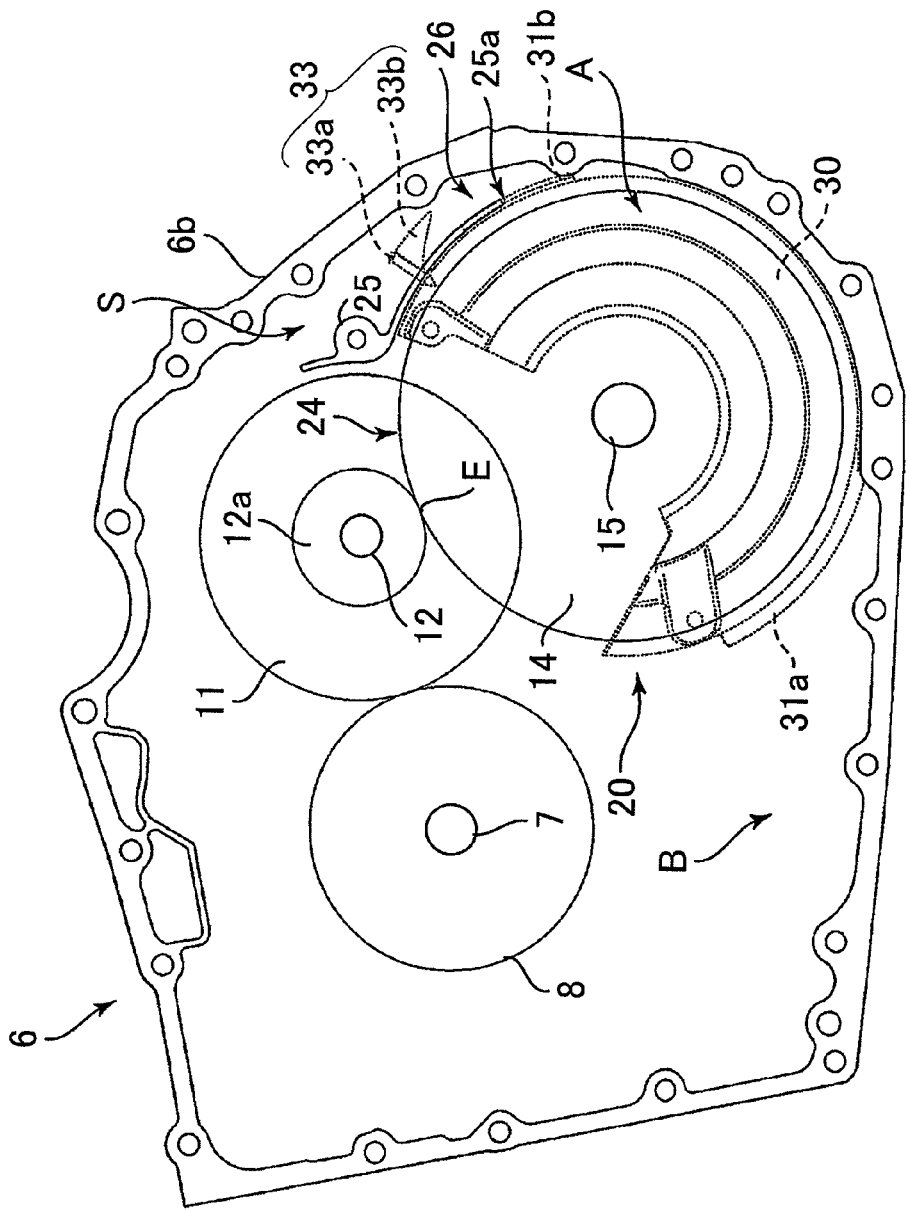
FIG. 6 is a front view showing the state in which the reservoir plate is attached in FIG. 3.

The structure of the differential chamber A in the state in which the reservoir plate 30 is attached will be described below with reference to FIGS. 5 and 6. As shown in FIGS. 5 and 6, the differential chamber A is formed by attaching the semispherical reservoir plate 30 to a boss $6b_1$, which protrudes from the inner surface of the housing case 6b toward the transmission case 6a, via an attachment portion 35. The differential chamber A is substantially spherical along the differential unit 5.

In the state in which the reservoir plate 30 is attached, the flange portions 31a, 31b of the reservoir plate 30 extend along the lower rib 23 and the discharge port 25a of the housing rib 25, respectively, from which the oil tends to leak, and these flange portions 31a, 31b are in close contact with the rib members 21, 25 so as not to allow the oil to flow into the differential chamber A. These flange portions 31a, 31b are pressed from the housing case side to the transmission case side by the housing rib 25, whereby the flange portions 31a, 31b are more firmly in close contact with the rib members 21, 25.

The opening 34b of the reservoir plate 30 and the opening 24a of the transmission rib 21 together form an opening 24 in the differential chamber A, so that the differential ring gear 14 can mesh with the output gear 12a of the countershaft 12 via the opening 24.

In an upper part of the differential separation member 20, the cutout 22a of the upper rib 22 and a hole 32 of the reservoir plate 30 together form a communication portion 26 for discharging the oil caught by the differential ring gear 14, at a position on the upstream side of the opening 24 in the rotation direction of the differential ring gear 14 during forward traveling. The differential chamber A communicates with the space portion S (the storage chamber B) formed outside the differential chamber A, by the communication portion 26.

The wall member 33 of the reservoir plate 30 is provided on the meshing portion E side of the communication portion 26. The wall member 33 stands upward so that the main body portion 33a extends along the upper edge of the cutout 22a (the edge located on the downstream side in the rotation direction $R_2$ of the differential ring gear 14 during forward traveling), and the lower side of the wall member 33 contacts the outer surface of the upper rib 22 (the surface of the upper rib 22 located on the side opposite to the surface faced by the differential shaft 15. This prevents oil $F_2$ scattered into the space portion S from flowing into the differential chamber A through the communication portion 26. That is, the wall member 33 stands perpendicularly from the outer surface of the upper rib 22 to prevent the oil from flowing into the differential chamber A through the cutout 22a.

The oil $F_2$, which flows from the side above the communication portion 26 along the outer surface of the upper rib 22 and the main body portion 33a, is guided to the side below the communication portion 26 by the guide portion 33b of the wall member 33, which is bent at a predetermined angle toward the housing case 6b.

Figure 7:
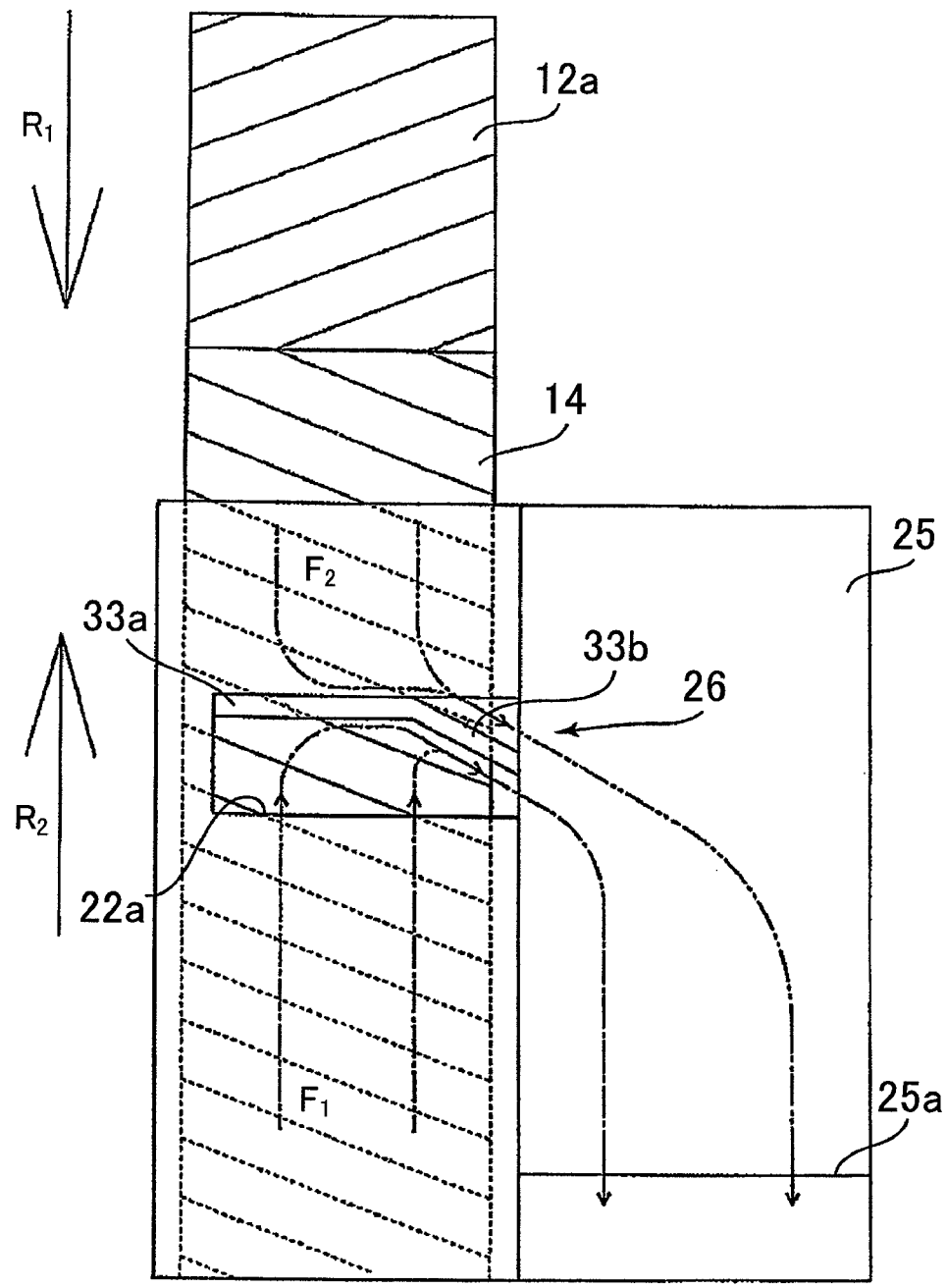
FIG. 7 is a schematic view showing oil flow around a differential chamber of the automatic transmission according to the first embodiment of the present invention.

Oil flow around the differential chamber will be described below with reference to FIGS. 5 to 7. When the driver gets into the vehicle, starts the engine 19, and shifts the shift range to D range, power of the engine 19 is transmitted from the input shaft 7 to the countershaft 12 via the counter gear 8 and the input gear 11.

When the power is transmitted from the input shaft 7 to the countershaft 12, the countershaft 12 starts rotating from above toward the meshing portion E via the inlet of the space portion S (in a rotation direction $R_1$ of FIGS. 5 and 7), and the power transmitted to the countershaft 12 is transmitted to the differential ring gear 14 of the differential unit 5 via the output gear 12a. Thus, the differential ring gear 14 rotates from below toward the meshing portion E via the communication portion 26 (in the rotation direction $R_2$ of FIGS. 5 and 7), and the power transmitted to the differential unit 5 is transmitted to the right and left wheels 18 by the differential shafts 15.

When the countershaft 12 starts rotating in the direction $R_1$, the oil is scattered from the input gear 11 and the output gear 12a into the space portion S. The oil $F_2$ entering the space portion S flows along the outer surface of the upper rib 22 to the lower side of the case member 6, and is blocked by the main body portion 33a of the wall member 33 when the oil $F_2$ is about to reach the communication portion 26.

The oil $F_2$ blocked by the main body portion 33a flows along the main body portion 33a, and is guided toward the housing case by the guide portion 33b that is bent from the main body portion 33a toward the housing case. The oil $F_2$ guided toward the housing case flows into the discharge port 25a of the housing rib 25, and flows along the outer surface of the semispherical reservoir plate 30 back into the storage chamber B.

On the other hand, when the differential ring gear 14 starts rotating in the direction $R_2$, oil $F_1$ caught by the differential ring gear 14 is discharged out of the differential chamber through the communication portion 26 that is formed by the cutout 22a extending through the upper rib 22 in the direction perpendicular to the axial direction of the differential shafts 15.

After being discharged from the differential chamber A, this oil $F_1$ flows onto the back surface of the main body portion 33a of the wall member 33 by inertia and flows along the main body portion 33a, and also flows while being collected toward the housing case by the triangular guide portion 33b. The oil $F_1$ that flows toward the housing case flows into the discharge port 25a of the housing rib 25, and flows along the outer surface of the semispherical reservoir plate 30 back into the storage chamber B.

As described above, the wall member 33 is formed to stand on the side above the communication portion 26. This can prevent the oil entering the space portion S from flowing into the differential chamber through the communication portion 26. In addition to the hole 32 of the reservoir plate 30, the cutout 22a is formed in the upper rib 22 as the communication portion 26. This enables the oil $F_1$ to be discharged also from the upper rib side, whereby the oil can be efficiently discharged from the differential chamber A. Thus, since the possibility that the oil may flow into the differential chamber is reduced, and also the oil can be efficiently discharged from the differential chamber A, the oil level in the differential chamber can be maintained at a low level, and the stirring resistance of the differential gear 14 can be reduced.

Moreover, the guide portion 33b is provided so as to be bent from the main body portion 33a of the wall member toward the housing case, and this guide portion 33b is formed in a triangular shape. Thus, the oil $F_2$ that flows from the side above the communication portion 26 can be guided to the discharge port 25a beyond the communication portion 26 so as to flow back into the storage chamber B. Moreover, the oil $F_1$ discharged from the communication portion 26 can be guided toward the housing case, and the possibility that the oil $F_1$ may flow back into the differential chamber can be reduced.

Note that in the first embodiment, the communication portion 26 extending through the differential separation member 20 is formed by the cutout 22a formed in the upper rib 22 and the hole 32 of the reservoir plate 30. However, a through portion need only be formed in at least the upper rib 22, and the cutout 22a may be a through hole that extends from the differential chamber A into the space portion S.

The wall member 33 need not necessarily be formed integrally with the reservoir plate 30. For example, the wall member 33 may be formed integrally with the upper rib 22, and the guide portion 33b of the wall member 33 need only be shaped so that the width of the guide portion 33b decreases from the main body portion toward the tip end, such as a trapezoidal shape, and need not necessarily have a triangular shape.

Figure 8:
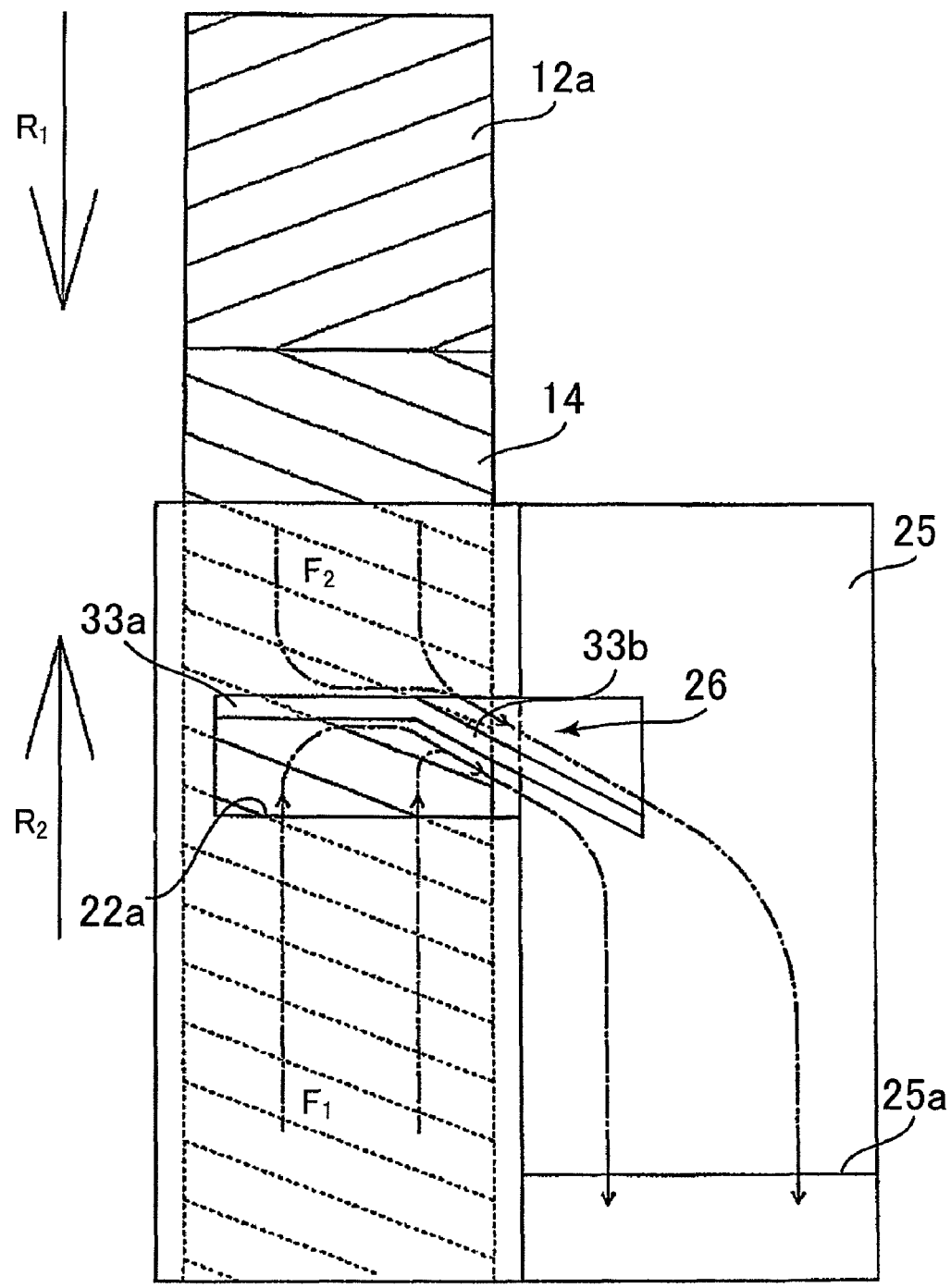
FIG. 8 is a schematic view showing oil flow around a differential chamber of an automatic transmission according to a modification of the first embodiment of the present invention.

Moreover, in the first embodiment, the tip end of the guide portion 33b is located at substantially the same position as that of the lower end of the cutout 22a. However, as shown in FIG. 8, the guide portion 33b may extend significantly downward beyond the cutout 22a, and may be formed so as to protrude toward the housing case.

Second Embodiment

A second embodiment of the present invention will be described below. Note that in the second embodiment, the wall member of the first embodiment is formed separately from the reservoir plate, and the guide portion is shaped so as not to protrude toward the housing case. Description of the same structure as that of the first embodiment will be omitted. In the first embodiment, the cutout 22a of the upper rib 22 and the hole 32 of the reservoir plate 30 together form the communication portion 26 for discharging oil caught by the differential ring gear 14. In the second embodiment, however, the hole 32 of the reservoir plate 30 is not provided, and only the cutout 22a of the upper rib 22 forms the communication portion 26.

As shown in FIGS. 9A-9C and FIGS. 10A-10F, a wall member 40 is formed as an independent part that is separate from the reservoir plate 30 and the upper rib 22. The wall member 40 is formed by attachment portions 41a, 41b, 41c for attaching the wall member 40 to the upper rib 22, inflow preventing portions 42, 43 for preventing oil from flowing into the cutout 22a of the upper rib 22 from the side of the opening 24a, and a discharge portion 43 for guiding oil discharged from the cutout 22a toward the housing case 6b and discharging the oil into the storage chamber B.

Specifically, the wall member 40 is structured by connecting a bag-shaped cover portion 43 that covers the cutout 22a, to a main body portion 42 formed by a rectangular plate member standing along an upper edge $22a_1$ of the cutout 22a, in the state in which the wall member 40 is attached to the upper rib 22. The main body portion 42 and an outer surface 43a of the cover portion 43 form the inflow preventing portions 42, 43.

That is, as shown in FIGS. 10A-10F, a surface (hereinafter referred to as the "front surface") 42a of the main body portion 42 facing the opening 24a is a tapered surface tilted from the side of the transmission case 6a to the side of the housing case 6b, so that oil flowing from the side of the opening 24a is guided toward the housing case 6b (in the direction shown by arrow H in FIG. 9C) along the slope of the front surface 42a of the main body portion 42, and flows back into the storage chamber B.

As shown in FIGS. 10A and 10F, the height of the main body portion 42 increases toward the housing case 6b, so that even if oil flows toward the housing case 6b, the oil does not flow beyond the main body portion 42. Even if the oil flows downward beyond the main body portion 42, no oil flows into the differential chamber A through the cutout 22a as the cutout 22a is covered by the cover portion 43.

The oil that has flown beyond the main body portion 42 is guided along the outer surface 43a of the cover portion 43 to the side below the cutout 22a or toward the housing case 6b so as to flow back into the storage chamber B. That is, the outer surface 43a of the cover portion 43 serves as a guide portion for guiding the oil flowing from above along the upper rib 22 to the side below the cutout 22a.

The cover member 43 (the wall member 40) is formed so as to open on the housing case side, and is structured so that its end face 43c located on the housing case side is substantially flush with a mating end face 22b of the upper rib 22 with the reservoir plate 30. In other words, the guide portion 43 is structured so as not to protrude toward the housing case 6b beyond the mating end face 22b of the upper rib 22 with the reservoir plate 30, namely a mating face X of the transmission case 6a and the housing case 6b (see also FIGS. 9A and 9B).

On the other hand, the cover portion 43 that forms the guide portion also forms the discharge portion by its inner surface 43b, and the inner surface 43b of the cover portion 43 has an upper standing surface $43b_1$ that stands on the back side of the main body portion 42, and a lower standing surface $43b_2$ that stands so as to face the upper standing surface $43b_1$.

An end of the cover member 43, which is located on the downstream side in the rotation direction of the differential ring gear 14 during forward traveling and forms the lower standing surface $43b_2$, is curved inward, so that the cover member 43 has a substantially J shape when viewed from the side. A guide passage 45 through which oil discharged from the cutout 22a flows is formed by an end 43d (hereinafter referred to as the "eaves portion") located inside the cover portion 43 and extending in the shape of eaves toward the main body portion 42, and the lower standing surface $43b_2$.

Moreover, like the front surface 42a of the main body portion 42, the lower standing surface $43b_2$ is a tapered surface tilted from the side of the transmission case 6a to the side of the housing case 6b. Thus, the oil discharged from the cutout 22a flows onto the upper standing surface $43b_1$ of the inner surface of the cover member, and flows into the guide passage 45 via a side surface 43e located on the transmission case side, due to a momentum generated when the oil flows onto the upper standing surface $43b_1$. The oil is then discharged toward the housing case along the slope of the lower standing surface $43b_2$ to flow back into the storage chamber B.

The attachment portions 41a, 41b, 41c for attaching the main body portion 42 and the cover portion 43 to the upper rib 22 are provided at two positions on the housing case side of the wall member 40 (in the direction shown by arrow H in FIG. 10E), namely below the main body portion 42 and at an attachment base of the eaves portion 43d, and at one position on the transmission case side of the wall member 40 (in the direction shown by arrow M in FIG. 10E), namely below the main body portion 42.

Each of the attachment portions 41a, 41b, 41c serves as a substantially U-shaped insertion portion for inserting therethrough an edge of the cutout 22a provided in the upper rib 22. The first attachment portion 41a provided below the main body portion 42 on the housing case side is structured so as to be inserted on the upper edge $22a_1$ of the cutout 22. The second attachment portion 41b provided at the attachment base of the eaves portion 43d on the housing case side is structured so as to be inserted on a lower edge (an edge located on the upstream side in the rotation direction $R_2$ of the differential ring gear 14 during forward traveling) $22a_2$ of the cutout 22a. The third attachment portion 41c provided below the main body portion 42 on the transmission case side is structured so as to be inserted on a side edge (a side edge located on the transmission case side of the cutout, see FIG. 2) $22a_3$ of the cutout 22a.

Thus, since the wall member 40 is structured as a separate member from the reservoir plate 30, the wall member 40 need not be extended from the reservoir plate that protrudes toward the housing case, and the guide portion of the wall member 40 can be formed by the cover portion 43 connected to the lower side of the main body portion 42. Accordingly, the wall member 40 can be contained in the transmission case, and the guide portion can be prevented from being damaged by contact with a member provided on the housing case side, when assembling the transmission case 6a and the housing case 6b together. This can increase assembly capability of the automatic transmission, and also can increase the yield.

More specifically, the transmission case 6a and the housing case 6b are assembled together after attaching the wall member 40 to the cutout 22a of the upper rib 22 and attaching the reservoir plate 30 to the transmission case 6a. At this time, since the guide portion 43 of the wall member 40 does not protrude beyond the mating face X of the transmission case 6a and the housing case 6b (see FIGS. 9A-9C), the possibility of contact between the guide portion 43 and a member on the housing case side can be reduced.

Since the wall member 40 is attached separately from the reservoir plate 30, the wall member 40 is not damaged by contact with the upper rib 22 when attaching the reservoir plate 30 to the transmission case 6a.

Moreover, since the guide portion 43 is formed by the bag-shaped cover portion 43 that covers the cutout 22a from above, the oil that has flown beyond the main body portion 42 can be prevented from flowing into the differential chamber A through the cutout 22a.

Since the main body portion 42 is formed integrally with the cover portion 43, and the wall member 40 is fixed to the upper rib 22 by the plurality of attachment portions 41a, 41b, 41c, the strength of the wall member 40 can be increased, and the wall member 40 can be held more firmly in close contact with the outer surface of the upper rib 22.

Moreover, since the wall member 40 is structured as an independent part, three-dimensional taper shapes, such as the front surface 42a of the main body portion 42 and the slope of the lower standing surface $43b_2$, can be formed by injection molding, casting, etc. In particular, since the wall member 40 can be formed by injection molding, the wall member 40 can be easily formed by plastic such as resins.

Note that although the upper standing surface $43b_1$, onto which the oil discharged from the cutout 22a first flows, is structured as a flat surface in the second embodiment, the upper standing surface $43b_1$ may be a tapered surface tilted from the transmission case side to the housing case side like the lower standing surface $43b_2$. Alternatively, the discharge portion 43b may be structured, in which the upper standing surface $43b_1$ is a tapered surface tilted from the housing case side to the transmission case side so that the oil discharged from the cutout 22a is efficiently collected to the guide passage 45 and is discharged from the guide passage 45 toward the housing case.

Alternatively, a discharge port that connects the inner surface 43b with the outer surface 43a of the cover member 43 may be provided on the transmission case side of the lower standing surface $43b_2$ that forms the guide passage 45, so that the oil accumulated on the transmission case side of the guide passage 45 due to a lack of a momentum can be discharged out of the cover portion 43.

The first and second embodiments are described with respect to a six-forward speed automatic transmission. However, it is to be understood that the present invention may be applied to any type of stepped automatic transmission such as an eight-forward speed automatic transmission, and may be applied to any type of vehicle transmission such as a continuously variable transmission having a three-axis structure, a hybrid drive device, or a manual transmission. It is also to be understood that the inventions disclosed in the first and second embodiments may be combined in any manner.

The vehicle transmission of the present invention can be mounted on passenger cars, trucks, buses, and the like, and is especially preferable when used as a vehicle transmission such as a multi-stage automatic transmission or a continuously variable automatic transmission, or a hybrid drive device.

What is claimed is:

1. A vehicle transmission, comprising:
an input shaft that is connected to a driving source and rotates;
a countershaft provided parallel to the input shaft;
a differential unit, which is positioned below the countershaft, to which rotation is input from the countershaft, and which is coupled to right and left wheels;
a case member that contains the input shaft, the countershaft, and the differential unit;
a differential chamber that is located in the case member, contains the differential unit, and is separated from a storage chamber that stores oil; and
a differential separation member that separates the differential chamber from the storage chamber, and is formed along a ring gear of the differential unit, which meshes with an output gear of the countershaft, wherein
the differential separation member has
an opening that opens so that the output gear can mesh with the ring gear,
a communication portion, which is formed in an upper part of the differential separation member, and is located on an upstream side of the opening in a rotation direction of the ring gear during forward traveling, and which discharges the oil from the differential chamber, and a wall member that is provided on a side of a meshing portion of the output gear and the ring gear with respect to the communication portion, and stands so as to contact an outer surface of the differential separation member.

2. The vehicle transmission according to claim 1, wherein the wall member has a main body portion that stands upward with a lower side of the wall member being in contact with the outer surface of the differential separation member, and a guide portion that guides the oil, which flows from above the communication portion along the outer surface of the differential separation member, to a side below the communication portion.

3. The vehicle transmission according to claim 2, wherein the guide portion is formed by bending the main body portion, and is formed so that a width of the guide portion decreases from the main body portion toward a tip end.

4. The vehicle transmission according to any one of claims 1, wherein
the differential separation member has the case member, a rib member that extends from the case member along an outer peripheral surface of the ring gear, and a semispherical reservoir plate that covers the differential unit from a side opposite to an inner surface of the case member with the ring gear interposed therebetween, and
the communication portion is formed in the rib member.

5. The vehicle transmission according to claim 4, wherein the wall member is formed integrally with the reservoir plate.

6. The vehicle transmission according to claim 4, wherein the wall member is formed separately from the reservoir plate, and the wall member is attached to the rib member so as not to protrude beyond a mating end face of the rib member with the reservoir plate.

* * * * *